No. 708,631. Patented Sept. 9, 1902.
C. FÖRSTER.
FEEDER FOR SEWING MACHINES.
(Application filed Dec. 9, 1901.)
(No Model.) 2 Sheets—Sheet 2.
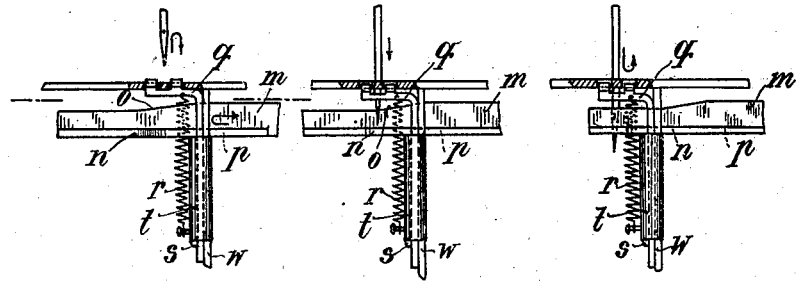
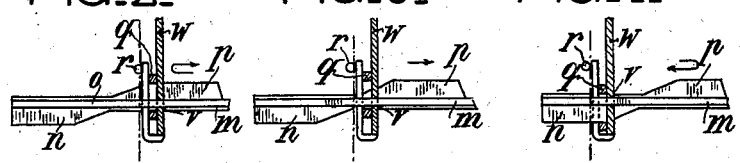
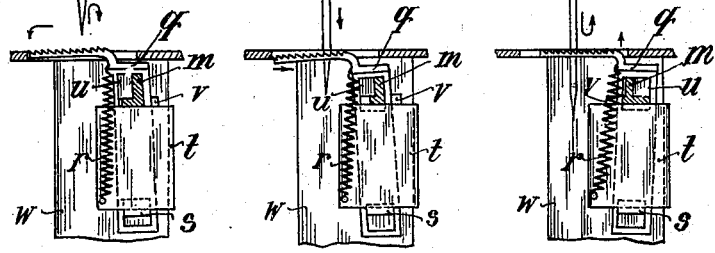
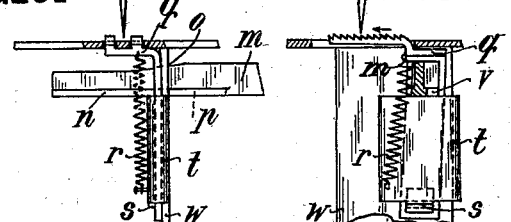
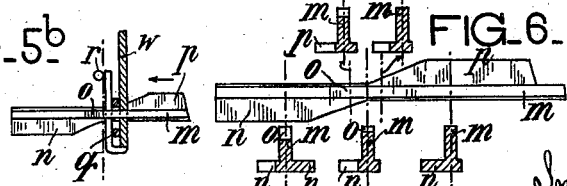
Witnesses
Thomas Kilpatrick
H. van Heerenbrinck
Inventor
Carl Förster
by Alexander & Co
Attorneys

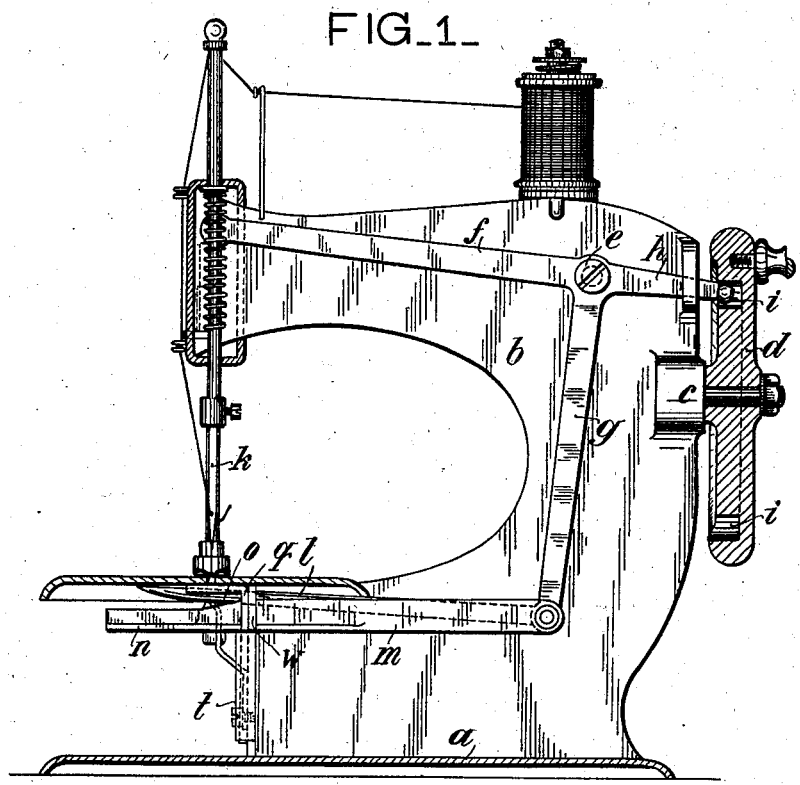

UNITED STATES PATENT OFFICE.

CARL FÖRSTER, OF GABLONZ, AUSTRIA-HUNGARY.

FEEDER FOR SEWING-MACHINES.

SPECIFICATION forming part of Letters Patent No. 708,631, dated September 9, 1902.

Application filed December 9, 1901. Serial No. 85,238. (No model.)

*To all whom it may concern:*

Be it known that I, CARL FÖRSTER, a subject of the Emperor of Austria-Hungary, residing at 5 Bismarckplatz, Gablonz, in the Kingdom of Bohemia and Empire of Austria-Hungary, have invented new and useful Improvements in Feeders for Sewing-Machines, of which the following is a specification.

My invention relates to an improved feeder for sewing-machines, the essential feature of which is that a feeder-bar having inclined bearing-faces for operating the feeder proper will in its movement in the longitudinal direction displace the feeder both horizontally and vertically at right angles to the direction of such movement.

On the accompanying drawings I have represented a chain-stitch sewing-machine designed to be worked by hand and furnished with the improved feeder; but the invention may also be applied to other kinds of sewing-machines.

Figure 1 is a side elevation of the sewing-machine, some parts of the same being shown in section. Figs. 2 to 6 are front views, plans, and side views, respectively, showing different positions of the needle and feeder.

Upon a base $a$ an arm $b$ is fixed, which carries at one end a horizontal stud $c$, upon which the hand-wheel $d$ of the machine turns, and on one of its sides a stud $e$, upon which a bell-crank lever $f$ $g$ $h$ turns. The movement of this bell-crank lever is effected by the hand-wheel $d$, which has an eccentric groove $i$ on its inner face, into which the end of the arm $h$ of the said lever fits and causes one of the other arms $f$, which is horizontal, to drive the needle-bar and needle $k$ up and down in the usual way, while the third arm $g$, which projects vertically down, actuates the feeder-bar $m$. The feeder-bar $m$ works at right angles to the movement of the feeder proper and has three inclined bearing-faces $n$ $o$ $p$, the function of which will hereinafter be described. The feeder proper, $q$, is held down by its own weight or also by a spring $r$, and it oscillates about a pin $s$, shown square in the drawings, on which it is guided by a check $t$. Through a square opening $u$ at its upper end passes the feeder-bar $m$, which is guided in a T-shaped slit $v$ in a fixed plate $w$. By the direct connection of the needle $k$ and feeder-bar $m$ with the same system of levers $f$ $g$ both reach their extreme positions at the same time, the feeder-bar being moved forward when the needle is raised, Fig. 2, while in the lowest position of the needle the feeder is drawn back. When the needle is at its highest point, Fig. 2, the inclined face $p$ of the feeder-bar has just moved the raised feeder forward and has thereby moved forward the material by the length of one stitch. When the needle now goes down, Fig. 3, the feeder-bar is at the same time drawn back until the second inclined face enters the opening $u$ in the feeder, whereupon the latter in its forward position goes down under the action of the spring $r$ or by its own weight. No backward movement of the feeder then takes place so long as the third inclined face $n$ does not enter the square opening $u$ in the feeder. Before the needle has reached its lowest position, Fig. 4, the inclined face $n$ draws the feeder back so as to occupy the position shown in Fig. 4$^c$, the feeder-bar being then in its farthest-back position. When finally the needle moves up, Fig. 5, the feeder-bar goes forward again and the face $o$ raises the feeder so that its teeth catch in the material to be sewed in order to move the latter forward through the length of one stitch. The movement of the feeder in the sides of the rectangular hole is therefore effected by a single feeder-bar, which is only rendered possible because the two inclined faces $n$ and $p$, which impart to the feeder the movement in a horizontal direction, are so arranged upon the feed-bar that they allow the feeder to remain at rest for a time before it is pushed in the opposite direction. Between the two movements the up or down movement takes place each time owing to the action of the third inclined face $o$, which is arranged upon the feeder-bar between the two inclined faces $n$ and $p$ in the longitudinal direction. The pointed looper-bar $l$ is also pivoted at its right-hand end to the lower end of the arm $g$ of the bell crank-lever, extends parallel with the feeder-bar $m$, and serves to open the loop for the needle. This looper $l$ and its coöperating stitch-forming elements are claimed specifically in my pending application, Serial No. 85,238, filed December 9, 1901.

What I claim as my invention, and desire to secure by Letters Patent, is—

1. A sewing-machine feed comprising, the feed-dog provided with an opening, of a horizontally-reciprocating feed-bar projecting at its free end through said opening, provided at opposite sides with oppositely-inclined faces to impart longitudinal reciprocation to the feed-dog and also provided on its upper side with a third inclined face to raise the feed-dog against the goods, and means for effecting the lowering of the feed-dog; substantially as described.

2. The combination with the feed-dog having a depending shank loosely pivoted at its lower end and provided thereabove with an opening, of a horizontally-operating feed-bar, projecting at its free end through said feed-dog opening, provided at opposite sides with oppositely-inclined faces to oscillate the dog back and forth and also provided on its upper side with a third inclined face to raise the feed-dog to the work; substantially as described.

3. The combination with the bell-crank lever and means for operating it, of a needle-bar connected to the horizontal arm of said lever, an oscillating feed-dog having an opening through its shank, a horizontal feed-bar pivoted at one end to the depending arm of the bell-crank lever and at its opposite end passed through the feed-dog opening and there provided on its opposite side with two oppositely-inclined faces to oscillate the feed-dog back and forth, and also provided on its upper side with a third incline to raise the feed-dog to the goods; substantially as described.

4. A sewing-machine comprising the bell-crank lever, means for operating the lever, the needle-bar pivoted to the horizontal arm of the lever, a horizontal pointed looper-bar pivoted to the depending arm of said lever for reciprocation thereby, a loosely-pivoted oscillating feed-dog, having an opening therethrough, and a horizontal feed-bar also pivoted to the depending arm of the said lever, with its free end passed through the feed-dog opening and there provided with three inclined faces to impart positive movement in three directions to the feed-dog; substantially as described.

In testimony whereof I have signed my name to this specification in the presence of two subscribing witnesses.

CARL FÖRSTER. [L. S.]

Witnesses:
FRANK W. MAHIN,
FRANZ SIMON.